(12) United States Patent
Brown (10) Patent No.: US 7,004,489 B2
(45) Date of Patent: Feb. 28, 2006

(54) CONNECTION DEVICE FOR INTERCONNECTING TUGGER CARTS (75) Inventor: Edmund W. Brown, Racine, WI (US)

(73) Assignee: Topper Industrial, Inc., Sturtevant, WI (US)

( * ) Notice: Subject to any disclaimer, the term of this patent is extended or adjusted under 35 U.S.C. 154(b) by 0 days.

(21) Appl. No.: 10/405,396

(22) Filed: Apr. 2, 2003

(65) Prior Publication Data
US 2004/0195803 A1 Oct. 7, 2004

(51) Int. Cl.
B60D 1/54 (2006.01)
(52) U.S. Cl. .................. 280/491.3; 280/510; 280/515
(58) Field of Classification Search ................ 280/508, 280/510, 509, 515, 495, 498, 490.1, 47.35, 280/79.11, 491.3, 514
See application file for complete search history.

(56) References Cited

U.S. PATENT DOCUMENTS

| 731,707 | A |   | 6/1903 | Putnam |   |
|---|---|---|---|---|---|
| 1,462,921 | A |   | 7/1923 | Reichmann |   |
| 1,744,972 | A | * | 1/1930 | Kline | 280/498 |
| 1,848,956 | A | * | 3/1932 | Koehler | 280/491.3 |
| 1,860,973 | A |   | 5/1932 | Yeakel |   |
| 1,938,407 | A |   | 12/1933 | Thomas et al. |   |
| D120,752 | S |   | 5/1940 | Gallinger |   |
| 2,414,404 | A |   | 1/1947 | Youther |   |
| 2,711,679 | A | * | 6/1955 | Kuhary et al. | 172/272 |
| 3,208,768 | A |   | 9/1965 | Hulbert |   |
| 3,561,622 | A |   | 2/1971 | Dioguardi |   |
| 4,279,431 | A |   | 7/1981 | Schott |   |
| 4,333,250 | A | * | 6/1982 | Henderson | 37/404 |
| 4,451,066 | A |   | 5/1984 | Collins |   |
| 4,456,291 | A |   | 6/1984 | Brogie |   |
| 4,585,259 | A |   | 4/1986 | Vidas |   |
| 5,350,077 | A | * | 9/1994 | Nezu et al. | 213/75 R |
| 5,425,560 | A |   | 6/1995 | Andersen et al. |   |
| 5,624,137 | A | * | 4/1997 | Lesesne | 280/839 |
| 6,394,481 | B1 | * | 5/2002 | Pinlam et al. | 280/510 |
| 6,619,687 | B1 | * | 9/2003 | Goby | 280/508 |

* cited by examiner

Primary Examiner—Anne Marie Boehler
(74) Attorney, Agent, or Firm—Boyle Fredrickson Newholm Stein & Gratz S.C.

(57) ABSTRACT

A connection device is provided for interconnecting first and second tugger carts. The connection device includes a striker element projecting from the first tugger cart. A connecting arm is pivotably connected to the second tugger cart and includes a terminal end that partially defines a recess for receiving the striker element therein. The connecting arm is pivotable between a storage position and a locking position. A locking pin is operatively connected to the connecting arm and is movable between an extended wherein the locking pin extends over an opening to the recess in the connecting arm and a retracted position wherein the striker element may be inserted into and removed from the recess. A handle is provided to allow a user to maintain the locking pin in the retracted position.

15 Claims, 5 Drawing Sheets

CONNECTION DEVICE FOR INTERCONNECTING TUGGER CARTS

FIELD OF THE INVENTION

This invention relates generally to wheeled carts, and in particular, to a connection device for interconnecting a plurality of tugger carts in order to form a train for transporting materials about a factory or the like.

BACKGROUND AND SUMMARY OF THE INVENTION

In order to transport pallets, containers and materials throughout a factory or the like, wheeled tugger carts are often used. These tugger carts allow an individual to deliver the pallets, containers or materials to a desired work station in the factory. It can be appreciated that the delivery of an individual tugger cart to various locales throughout the factory can be a time consuming and inefficient task. As such, it is highly desirable to provide a more efficient method for transporting pallets, containers and materials throughout the factory.

In order to increase the efficiency of transporting pallets, containers or materials throughout the factory, it has been contemplated to interconnect multiple carts together to form a train. By way of example, Dioguard, U.S. Pat. No. 3,561,622 discloses a train formed from a plurality of cargo trailers. A powered drive vehicle is provided as a source of power to control movement of the train of cargo trailers. Each of the cargo trailers are interconnected by a coupling means. The coupling means allow for the power generated by the drive vehicle to be translated to each cargo trailer.

The cargo train disclosed in the '662 patent is functional for its intended purpose. However, the coupling means disclosed therein for interconnecting the cargo trailers must allow for the transmission of power generated by the drive vehicle to be translated to each of the cargo trailers. For manually operated carts, such a coupling means is far too complicated and expensive to implement. As such, it is highly desirable to provide a simple device for interconnecting a plurality of manually operated tugger carts in order to form a train for transporting pallets, containers and materials about a factory or the like.

Therefore, it is a primary object and feature of the present invention to provide a connection device for interconnecting multiple tugger carts for transporting pallets, containers and materials throughout a factory that is simple to use and inexpensive to manufacture.

It is a further object and feature of the present invention to provide a connection device for interconnecting multiple tugger carts for transporting pallets, containers and materials throughout a factory in a secure manner.

It is a still further object and feature of the present invention to provide a connection device for interconnecting multiple tugger carts for transporting containers and materials throughout a factory that allows a user to simultaneously transport such tugger carts.

In accordance with the present invention, a connection device is provided for interconnecting first and second tugger carts. The connection device includes a striker element projecting from the first tugger cart and a connecting arm operatively connected to the second tugger cart. The connecting arm has a hooked terminal end that partially defines a recess for receiving the striker element therein. The connecting arm is pivotable between a storage position and a locking position. A locking pin is operatively connected to the connecting arm and is movable between a retracted position for allowing the striker element to be inserted into and removed from the recess and an extended position for maintaining the striker element in the recess. A biasing structure urges the locking pin towards the extended position. A handle is operatively connected to the connecting arm. The handle is pivotable between a non-actuated position wherein the locking pin is free to move between the retracted and the extended positions and an actuated position wherein the locking pin is maintained in the retracted position.

A connection bracket is operatively connected the second tugger cart. A pivot pin extends through the connection bracket and the connecting arm for allowing pivotable movement of the connecting arm. The connecting arm includes an opening for allowing the pivot pin to pass therethrough and the connection bracket includes a notch formed therein. The opening in the connecting arm is generally oblong for allowing limited axial movement of the connecting arm between an operating position wherein the connecting arm is free to pivot between the storage and the locking position and a non-operating position. In addition, the connecting arm includes a lock pin projecting therefrom. The lock pin is receivable in the notch in the connection bracket with the connecting arm in the storage and the non-operating positions such that the connecting arm is prevented from pivoting to the locking position.

The locking pin includes a chamfered face engageable with the striker element as the connecting arm is pivoted from the storage position to the locking position such that the striker element urges the locking pin towards the retracted position against the urging of the biasing structure. The locking pin also includes a tension pin projecting therefrom. The handle includes a grasping portion and an actuating bar. The actuating bar is pivotably connected to the connecting arm and has a first end connected to the grasping portion and a second end engageable with the tension pin for moving the locking pin from the extended position to the retracted position. It is contemplated that the striker element take the form of a generally U-shaped bracket that defines a cavity for receiving the terminal end of the connecting arm with the connecting arm in the locking position.

In accordance with a further aspect of the present invention, a connection device is provided for interconnecting first and second tugger carts. The connection device includes a striker element projecting from the first tugger cart and a connecting assembly operatively connected to the second tugger cart. The connecting assembly includes a connecting arm having a terminal end that partially defines a recess for receiving the striker element therein. The connecting arm is pivotable between a storage position and a locking position and is axially movable between an extended position and a non-extended position. The connection assembly also includes a locking pin and a handle. The locking pin is movable between an extended position wherein the locking pin extends over an opening to the recess in the connecting arm and a retracted position wherein the striker element may be inserted into and removed from the recess. The handle is operatively connected to the connecting arm. The handle is pivotable between a non-actuated position and an actuated position wherein the locking pin is maintained in the retracted position.

It is contemplated for the connecting assembly to include a connection bracket and a pivot pin. The connection bracket is connected to the second tugger cart and has a notch formed therein. The pivot pin extends through the connection bracket and the connecting arm for allowing pivotable movement of the connecting arm. The connecting arm includes an oblong opening therethrough for receiving the pivot pin and for allowing axial movement of the connecting arm between the extended and non-extended positions. The connecting arm also includes a lock pin projecting therefrom. The lock pin is receivable in the notch in the connection bracket for maintaining the connecting arm in the storage position.

It is contemplated for the locking pin to include a chamfered face that is engageable with the striker element as the connecting arm is pivoted from the storage position to the locking position such that the striker element urges the locking pin towards the retracted position. The striker element may take the form of a generally U-shaped bracket that defines a cavity for receiving the terminal end of the connecting arm with the connecting arm in the locking position. The locking pin may also include a tension pin projecting therefrom. The handle includes a grasping portion and an actuating bar. The actuating bar is pivotably connected to the connecting arm and has a first end connected to the grasping portion and a second end engageable with the tension pin for moving the locking pin from the extended position to the retracted position.

In accordance with a still further aspect of the present invention, a connection device is provided for releasably connecting first and second tugger carts. The connection device includes a generally U-shaped striker element projecting from the first tugger cart. The striker element defines a connection cavity. A connection bracket is operatively connected to the second tugger cart. The connection bracket has a notch formed therein. A connecting arm has a terminal end that partially defines a recess for receiving the striker element therein and is axially movable between an extended position and a non-extended position. A pivot pin extends through the connection bracket and the connecting arm for allowing the connecting arm to pivot between a storage position and a locking position. A locking pin is operatively connected to the connecting arm and is movable between an extended position wherein the locking pin extends over an opening to the recess in the connecting arm and a retracted position wherein the striker element may be inserted into and removed from the recess. A biasing structure urges the locking pin towards the extended position. A handle is operatively connected to the connecting arm. The handle is pivotable between a non-actuated position wherein the locking pin is free to move between the retracted position and the extended position and an actuated position wherein the locking pin is maintained in the retracted position.

The connecting arm includes an oblong opening therethrough for receiving the pivot pin and for allowing axial movement of the connecting arm between the extended position and the non-extended position. The connecting arm also includes a lock pin projecting therefrom. The lock pin is receivable in the notch in the connection bracket for maintaining the connecting arm in the storage position. The locking pin includes an angled face engageable with the striker element as the connecting arm is pivoted from the storage position to the locking position such that the striker element urges the locking pin towards the retracted position. The locking pin also includes a tension pin projecting therefrom and the handle includes a grasping portion and an actuating bar. The actuating bar is pivotably connected to the connecting arm and has a first end connected to the grasping portion and a second end engageable with the tension pin for moving the locking pin from the extended position to the retracted position.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE DRAWINGS

Figure 1:
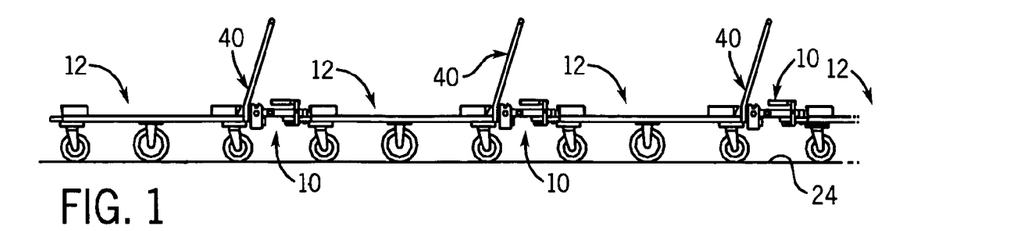
FIG. 1 is a side elevational view of a plurality of tugger carts releasably connected to each other utilizing a plurality of connection devices in accordance with the present invention.

Referring to FIGS. 5–11, a connection device in accordance with the present invention is generally designated by the reference numeral 10. It is intended that connection device 10 be used to interconnect a plurality of tugger carts 12, FIG. 1, as hereinafter described. In order to facilitate understanding of the present invention, one of the plurality of tugger carts 12 is designated as leading tugger cart 12a and one of the plurality of tugger carts 12 is designated as a trailing tugger cart 12b, FIGS. 2–4. However, it can be appreciated that tugger carts 12, 12a and 12b are identical in structure, and as such, the description hereinafter of leading tugger cart 12a is understood to describe tugger carts 12 and 12b as if fully described herein.

Leading tugger cart 12a includes a generally flat base 14 defined by generally flat upper surface 14a and generally flat lower surface 14b. Upper and lower surfaces 14a and 14b, respectively, are interconnected by sides 16 and 18, leading edge 20 and trailing edge 22. Base 14 is supported above supporting surface 24 such as a factory floor or the like by a plurality of casters 26 and a plurality of tires 28. As is conventional, each caster 26 includes a mounting plate 30 having upper and lower surfaces 30a and 30b, respectively. U-shaped frames 32 depend from the lower surfaces 30b of mounting plates 30 of casters 26. Axles extend between the legs of U-shaped brackets 32 to rotatably support corresponding caster wheels 34 thereon. It is contemplated to mount each caster to base 14 about the periphery thereof. By way of example, casters may be positioned adjacent the intersection of side 16 of base 14 and leading edge 20 of base 14; adjacent the intersection of leading edge 20 of base 14 and the side 18 of the base 14; adjacent the intersection of side 18 of base 14 and trailing edge 22 of base 14; and adjacent the intersection of trailing edge 22 of base 14 and side 16 of base 14.

Each of the tires 28 are rotatably supported between the legs of the generally U-shaped bracket 36. U-shaped brackets 36 depend from corresponding mounting plates 38 that are mounted to the lower surface 14b of base 14 between leading edge 20 and trailing edge 22. It is contemplated to position one of the mounting plates adjacent side 18 of base 14 and the other of the mounting plates adjacent side 16 of base 14.

Leading tugger cart 12 further includes a generally U-shaped handle 40 mounted to the trailing edge 42. Handle 40 includes spaced leg portions 42 and 44 having first ends 42a and 44a, respectively, interconnected to trailing edge 22 of base 14 and opposite second ends 42b and 44b, respectively, that are vertically and horizontally spaced from base 14. Second ends 42b and 44b of legs 42 and 44, respectively, are interconnected by a generally horizontal handle grasping portion 46 which allows a user to push and pull leading tugger cart 12a in a conventional manner.

Figure 11:
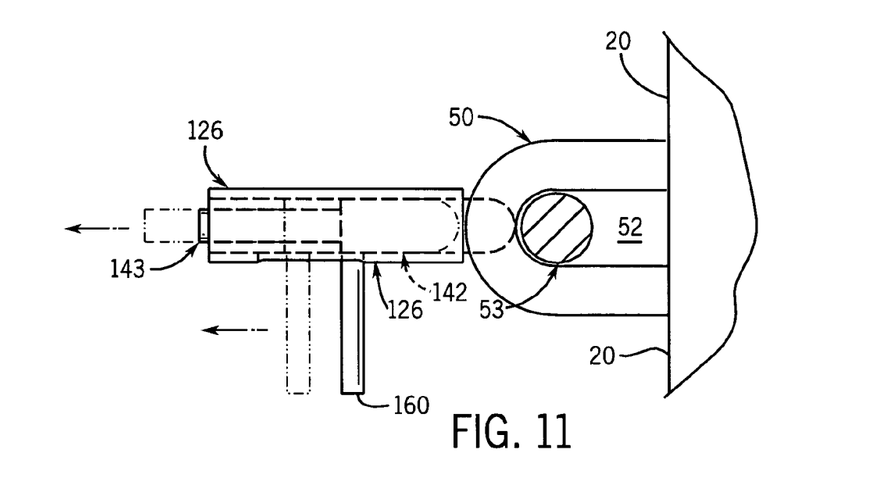
FIG. 11 is a cross-sectional view of the connection device of the present invention taken along line 11—11 of FIG. 10.

In order to interconnect leading tugger cart 12a and trailing tugger cart 12b, connection device 10 is provided. Connection device 10 includes a generally U-shaped striker element 50 projecting from leading edge 20 of base 14 of trailing tugger cart 12b. As best seen in FIG. 11, U-shaped striker element 50 defines passageway 52 therethrough for receiving pin member 53, as hereinafter described.

Connection device 10 further includes a coupling assembly generally designated by reference numeral 54. Coupling assembly 54 includes mounting bracket 56 mounted to the lower surface 14b of base 14 of leading tugger cart 12a. Mounting bracket 56 includes mounting tongue 60 projecting horizontally from trailing edge 58 thereof. Mounting tongue 60 includes lower face 62 directed towards supporting surface 24 and upper face 64. Connection bracket 66 projects vertically from upper face 64 of tongue 60 and includes first and second spaced sidewalls 68 and 70, respectively. Sidewall 68 includes lower edge 68a affixed to upper face 64 of tongue 60 and upper edge 68b having a notch 72 formed therein, for reasons hereinafter described. Sidewall 68 further includes leading edge 74 and trailing edge 76. The intersection of upper edge 68b of sidewall 68 and trailing edge 74 of sidewall 68 defines a generally arcuate portion 76, for reasons hereinafter described. Leading edge 74 of sidewall 68 and leading edge 78 of sidewall 70 are interconnected by a generally vertical support plate 80. Similarly, the lower portions of trailing edge 74 and 82 of sidewalls 68 and 70, respectively, are interconnected by support block 84.

Figure 7:
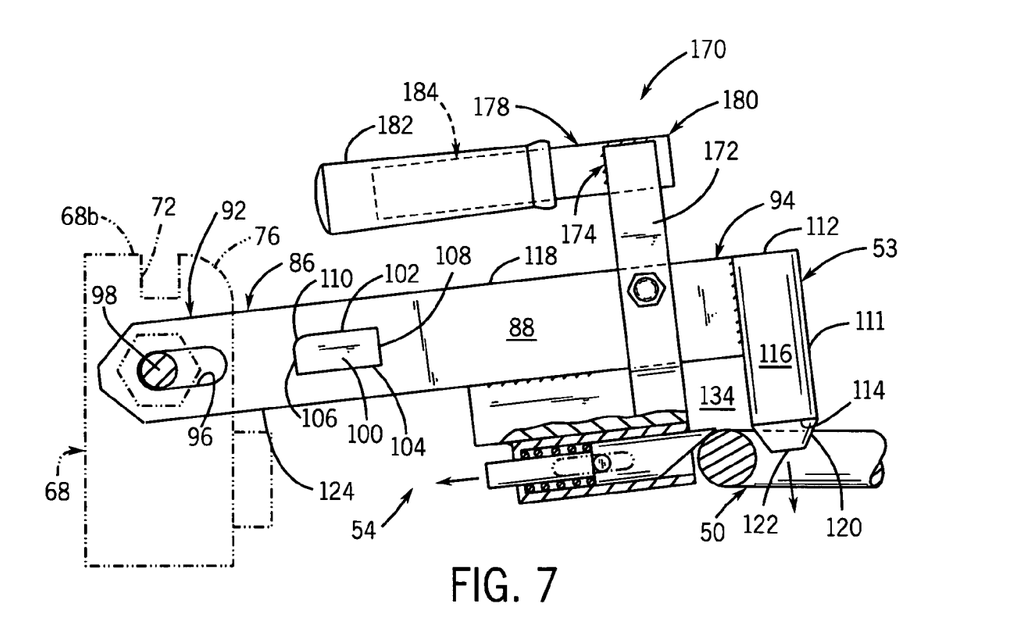
FIG. 7 is an enlarged, side elevational view, partially in section, showing a the connection device of the present invention.
Figures 8, 9:
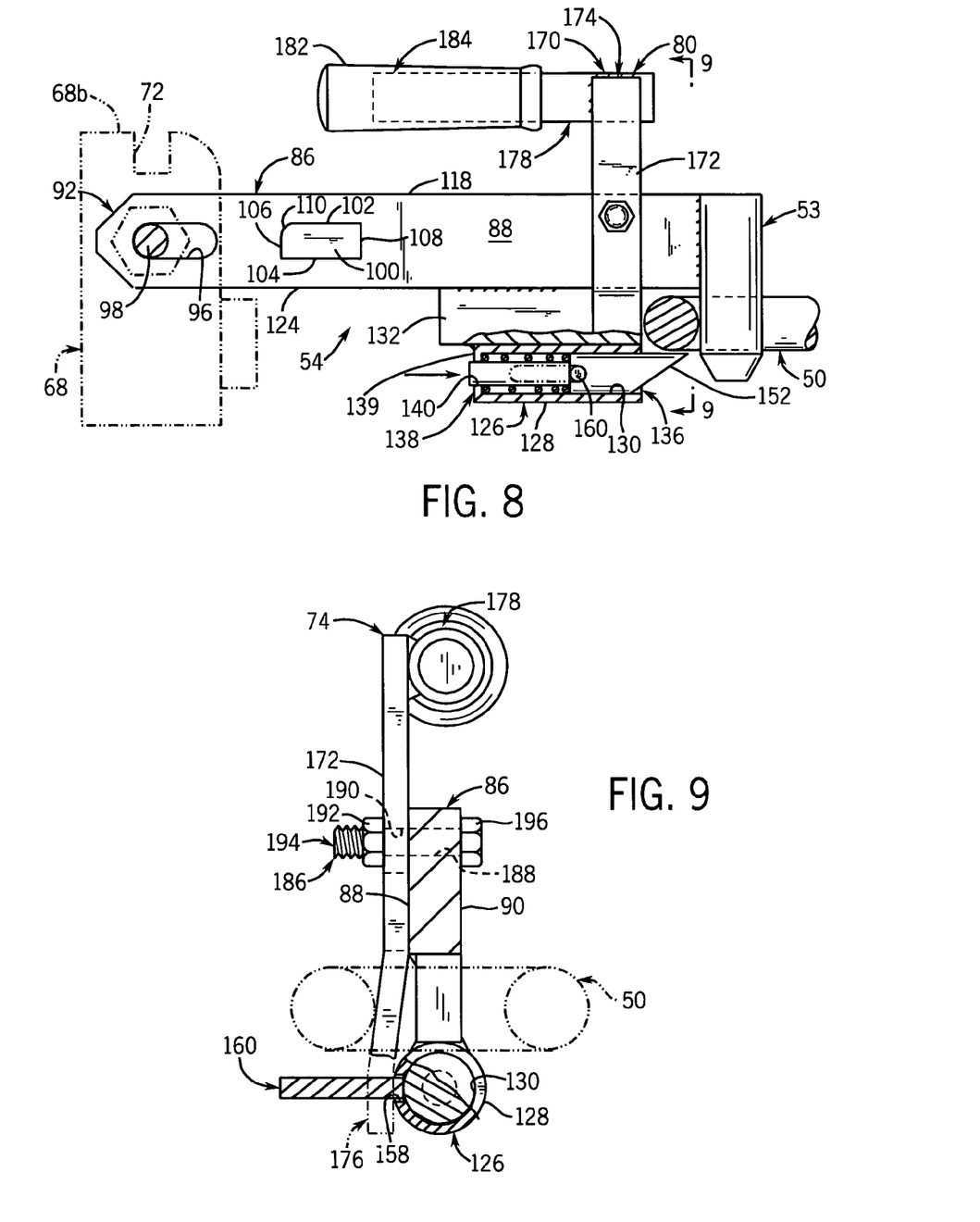
FIG. 8 is a side elevational view, partially in section, showing the connection device of the present invention.
FIG. 9 is a cross-sectional view of the connection device of the present invention taken along line 9—9 of FIG. 8.

Coupling assembly 54 further includes arm 86 having first and second sides 88 and 90, respectively, FIG. 9, and leading and trailing ends 92 and 94, respectively. Leading end 92 of arm 86 is received between sidewalls 68 and 70 of connection bracket 66 and includes a generally oblong opening 96 therethrough. Bolt 98 extends through sidewalls 68 and 70 of connection bracket 66, as well as, through opening 96 in arm 86. As described, second end 92 of arm 86 is captured between sidewalls 68 and 70 of connection bracket 66 so as to allow pivotable movement of arm 86 on bolt 98 between a storage position, FIG. 3, and a locking position, FIG. 4. In addition, the shape of oblong opening 96 through arm 86 allows arm 86 to move between a retracted position, FIG. 6, and an extending position, FIGS. 7–8.

Arm 86 further includes lock pin 100 projecting laterally from first side 88 thereof. Lock pin 100 is defined by first and second generally parallel sides 102 and 104, respectively, and first and second generally flat ends 106 and 108, respectively. Intersection 110 of end 106 and side 102 of lock pin 100 is generally arcuate. It is intended that the shape of intersection 110 of lock pin 100 in combination with the shape of arcuate portion 76 of sidewall 68 of connection bracket 66 allows lock pin 100, and hence arm 86, to pivot therepast as arm 86 is pivoted between the storage position, FIGS. 3 and 6, and the locking position, FIGS. 4–5 and 8. Further, as heretofore described, oblong opening 96 in second end 92 of arm 86 allows for the limited axial movement thereof. As a result, with arm 86 in the storage position, arm 86 may be released such that arm 86 moves axially downward toward its retracted position wherein lock pin 100 becomes seated in notch 72 in upper edge 68b of sidewall 68 of connection bracket 66 so as to maintain arm 86 in the storage position.

Figure 6:
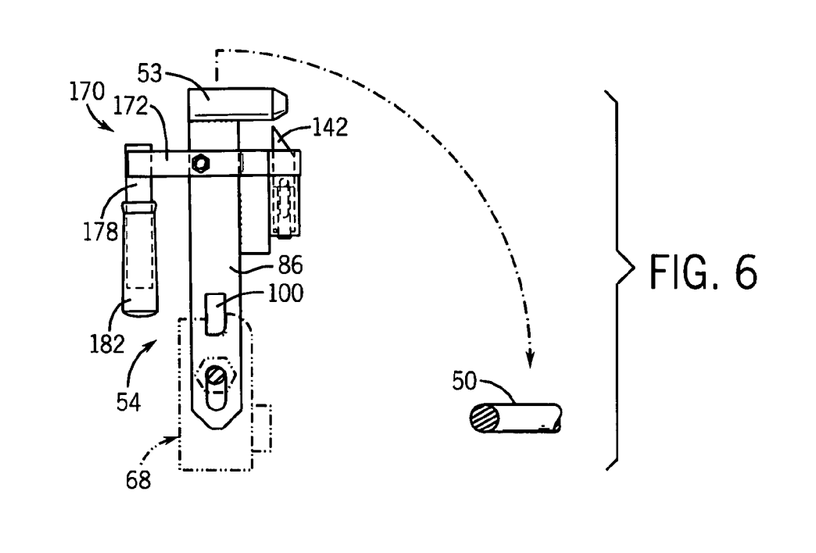
FIG. 6 is a side elevational view of the connection device of the present invention.

Pin member 53 is interconnected to and depends from trailing end 94 of arm 86. Pin member 53 includes upper and lower ends 112 and 114, respectively, interconnected by a generally cylindrical outer pin surface 116. As best seen in FIGS. 6–8, upper end 112 of pin member 53 is generally co-planar with upper edge 118 of arm 86. Pin member 53 further includes a generally conical shaped engagement portion 120 depending from and integrally connected to lower end 114 thereof. Engagement portion 120 terminates at a generally flat terminal end 122 which is vertically spaced from lower edge 124 of arm 86 such that arm 86 and pin member 53 define a hooked portion for engaging striker element 50, as hereinafter described.

Connection assembly 54 further includes a generally tubular locking pin housing 126 having a generally cylindrical outer surface 128 and a generally cylindrical inner surface 130 defining a passageway therethrough. Outer surface 128 of locking pin housing 126 is interconnected to lower edge 124 of arm 86 by spacer plate 132. The height of spacer plate 132 is generally equal to the diameter of striker element 50 so as to define recess 134 for receiving a portion of striker element 50 therebetween. Locking pin housing 126 further includes an open trailing end 136 and a partially closed leading end 138 by end wall 139. End wall 139 includes opening 140 therethrough, for reasons hereinafter described.

Figure 10:
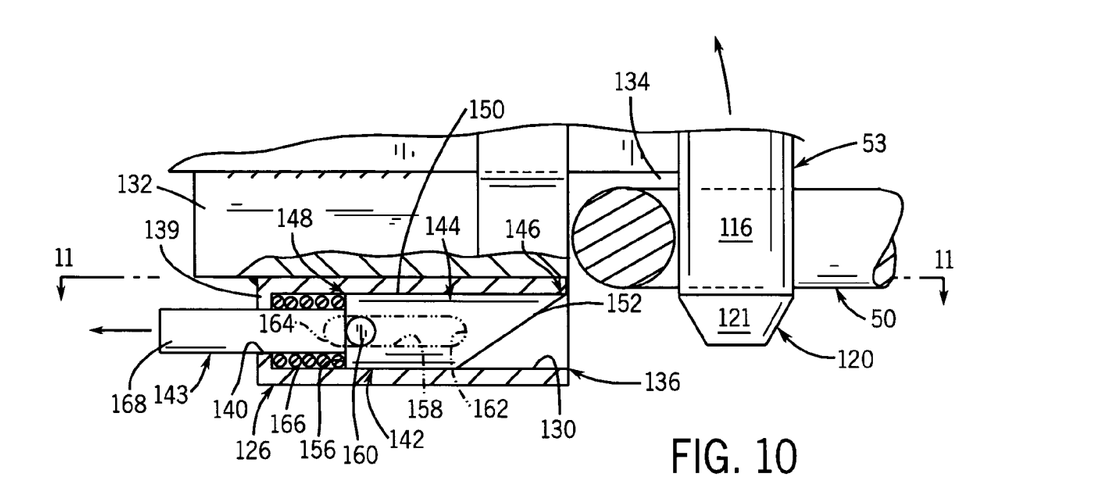
FIG. 10 is an enlarged, side elevational view, partially in section, showing a portion of the connection device of the present invention.

Referring to FIGS. 9 and 10, a locking pin, generally designated by the reference numeral 142, is slidably received in the passageway through locking pin housing 126. Locking pin 142 includes leading portion 143 and trailing portion 144 having trailing end 146 and leading end 148. Trailing portion 144 of locking pin 142 includes a generally cylindrical outer surface 150 that forms a slidable interface with inner surface 130 of locking pin housing 126. Trailing end 146 of trailing portion 144 of locking pin 142 terminates a chamfered surface 152 for facilitating the coupling of arm 86 to striker element 50, as hereinafter described.

Leading portion 143 of locking pin 142 projecting axially from leading end 148 of trailing portion 144 of locking pin 142 such that the intersection of leading portion 143 and trailing portion 144 of locking pin 142 defines shoulder 156. Leading portion 143 of locking pin 142 extends through opening 140 in end wall 139 of locking pin housing 156.

Locking pin housing 126 further includes generally oblong opening 158 extending along an axis generally parallel to the axis of arm 86. It is intended that oblong opening 158 in locking pin housing 126 receive pin 160 projecting from outer surface 150 of trailing portion 144 of locking pin 142. Opening 158 in locking pin housing 126 includes trailing closed end 162 for limiting movement of the locking pin in the trailing direction, and closed leading end 164 for limiting movement of locking pin 142 in the leading direction. As described, locking pin 142 is slidable in locking pin housing 126 between an extended position, FIG. 8, and a retracted position, FIG. 10. Spring 166 is positioned about outer surface 168 of leading portion 143 of locking pin 142 between end wall 139 of locking pin housing 126 and shoulder 156 formed in locking pin 142. Spring 166 urges locking pin 142 towards its extended position, FIG. 8.

Coupling assembly 54 further includes handle structure 170 defined by actuating bar 172 pivotably connected to arm 86 and tubular handle 178. Actuating bar 172 has a handle end 174 and an actuating end 176. Tubular handle 178 has a first end 180 rigidly connected to handle end 174 of actuating bar 172 by welding or the like and a second end 184. Grasping member 182 is slid over second end 184 of handle 178 to facilitate the grasping of handle 178 by a user. Referring to FIG. 9, it can be appreciated that actuating bar 172 may be pivotably connected to arm 86 in any suitable manner, such as by means of bolt 186 extending through opening 188 in arm 86 and through opening 190 in actuating bar 172. Nut 192 is threaded onto threaded end 194 of bolt 196 thereby pivotably connect actuating arm 172 of handle structure 170 to arm 86 between nut 192 and bolt head 196. As described, handle structure 170 is pivotable between an actuated position, FIG. 10, wherein actuating bar 172 engages pin 160 of locking pin 142 and urges locking pin 142 to the retracted position against the bias of spring 166 and a non-actuating position wherein locking pin 142 is in the extended position.

Figure 2:
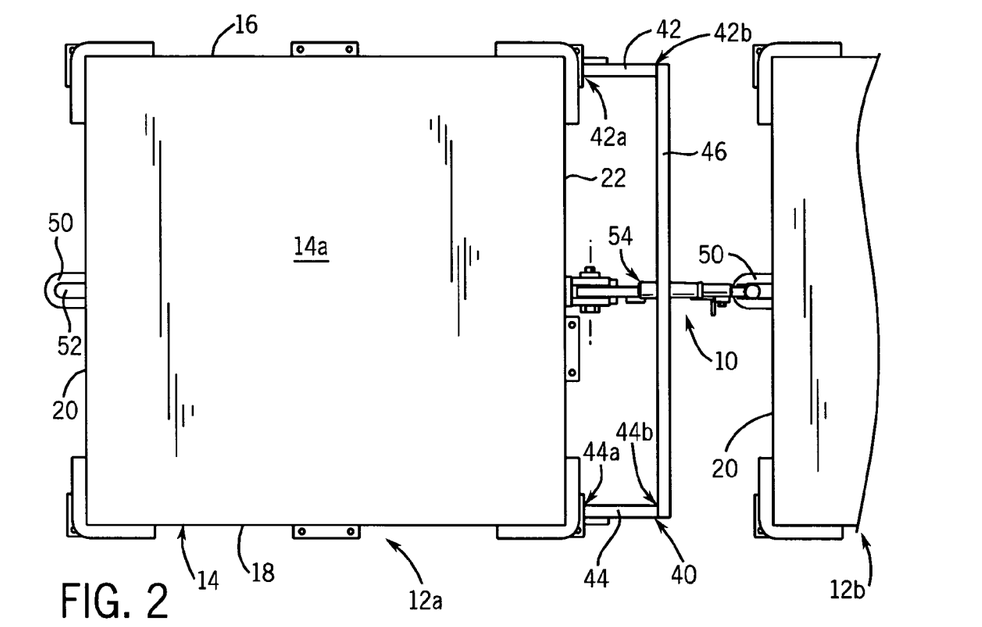
FIG. 2 is a top plan view of leading and trailing tugger carts operatively connected by a connection device in accordance with the present invention.
Figure 3:
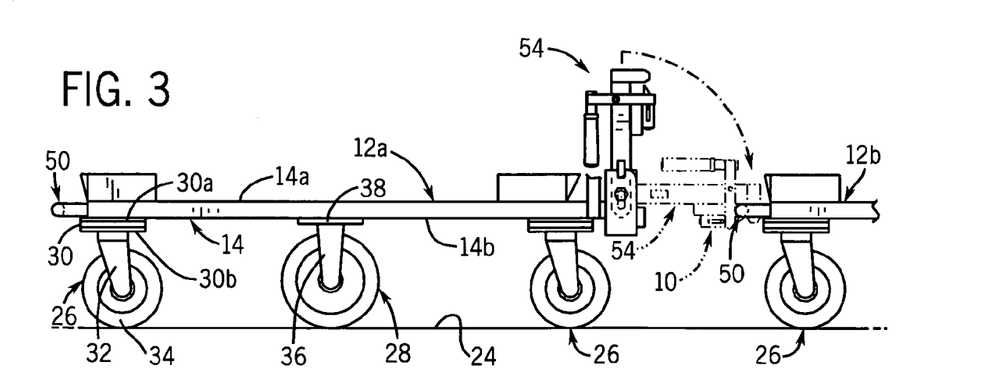
FIG. 3 is a side elevational view of the leading and trailing tugger carts of FIG. 2.
Figure 4:
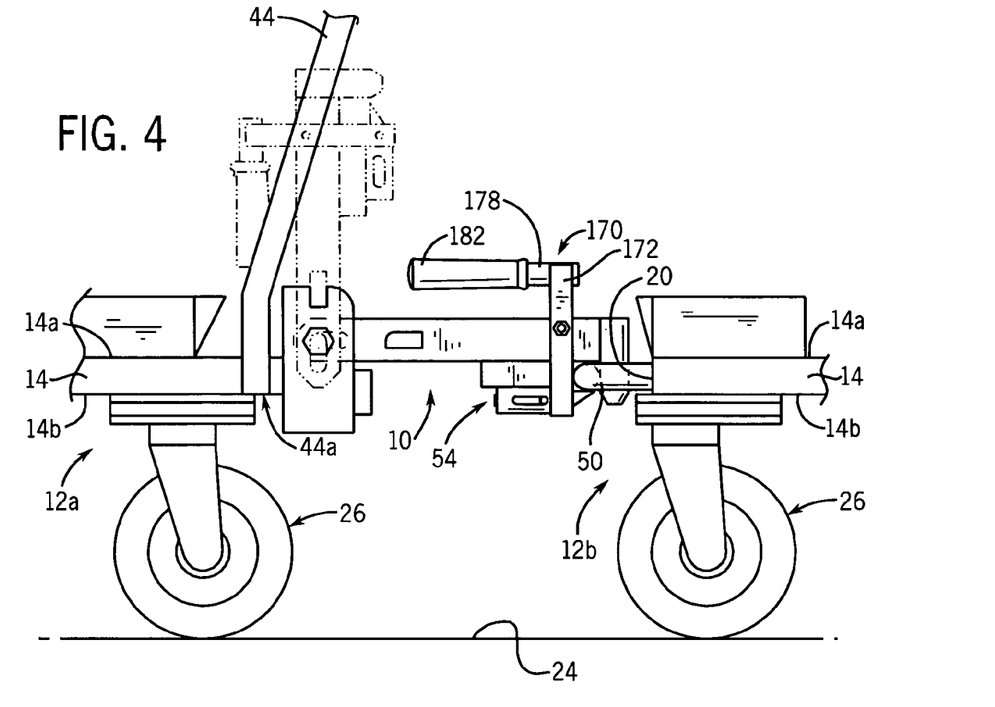
FIG. 4 is an enlarged, side elevational view showing the connection device of the present invention.
Figure 5:
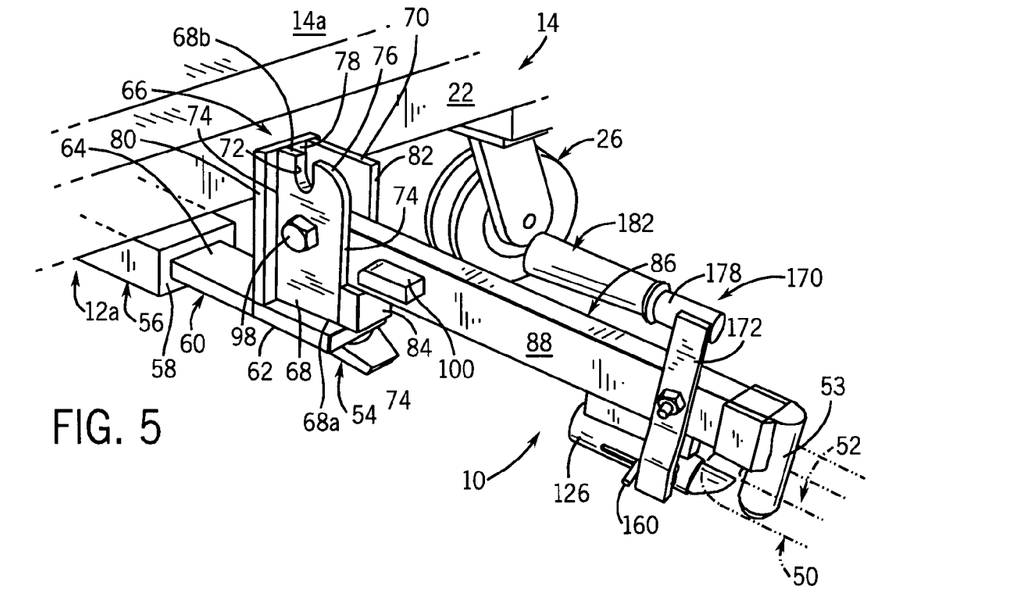
FIG. 5 is an isometric view showing a portion of the connection device of the present invention.

In order to interconnect leading cart 12a and trailing cart 12b, leading and trailing carts 12a and 12b, respectively, are positioned adjacent one another, as best seen in FIGS. 2–4. Arm 86 is axially lifted by a user so as to remove lock pin 100 from notch 72 in upper edge 68b of sidewall 68 of connection bracket 66 and to allow arm 86 to pivot between the support position and the locking position. As coupling assembly 54 approaches striker element 50, chamfered surface 152 of locking pin 142 engages striker element 50 such that striker element 50 urges locking pin 142 towards the retracted position. As a result, striker element 50 is allowed to enter recess 134 between spacing element 132 and pin member 53. Simultaneously, engagement portion 120 of pin member 53 enters passageway 52 defined by striker element 50. It can be appreciated that the conical outer surface 121 of engagement portion 120 facilitates the alignment of pin member 53 with passageway 52 defined by striker element 50 thereby allowing pin member 53 to pass through passageway 52. With a portion of striker element 50 received within recess 134 between spacing element 132 and pin element 53, locking pin 142 returns to the extended position so as to capture striker element 50 within recess 134 thereby coupling leading cart 12a with trailing cart 12b.

In order to de-couple leading cart 12a from trailing cart 12b, handle structure 170 is pivoted from the non-actuated position, FIG. 8, to the actuated position, FIG. 10, so as to move locking pin 142 from its extended position to its retracted position. With locking bolt 142 its the retracted position, striker element 50 is free to exit recess 134 between spacing element 132 and pin element 53 and arm 86 may be pivoted from the locking position to the storage position. As arm 86 is pivoted, pin element 53 exists passageway 52 defined by striker element 50 so as to de-couple leading cart 12a and trailing cart 12b. Arm 86 may then be pivoted to the storage position and released such that arm 86 returns to the non-extended position and lock pin 100 once again becomes seated within notch 72 in upper edge 68b of sidewall 68 of connection bracket 66.

Various modes of carrying out the invention are contemplated as being within the scope of the following claims particularly pointing out and distinctly claiming the subject matter that is regarded as the invention.

I claim:

1. A connection device for interconnecting first and second tugger carts, comprising:
    a striker element projecting from the first tugger cart;
    a connecting arm having a first end operatively connected to the second cart and a hooked terminal end that partially defines a downwardly directed recess for receiving the striker element therein, the first end of the connecting arm being vertically movable and the connecting arm being pivotable between a generally vertical storage position and a generally horizontal locking position;
    a locking pin operatively connected to the connecting arm and movable between a retracted position for allowing the striker element to be inserted into and removed from the recess and an extended position for maintaining the striker element in the recess, the locking pin including a lower chamfered face engageable with the striker element as the connecting arm is pivoted from the storage position such that the striker element urges the locking pin towards the retracted position and an upper, non-chamfered face for maintaining the striker element in the recess;
    biasing structure for urging the locking pin towards the extended position; and
    a handle operatively connected to the connecting arm, the handle pivotable between a non-actuated position wherein the locking pin is free to move between the retracted and the extended positions and an actuated position wherein the locking pin is maintained in the retracted position.

2. The connection device of claim 1 further comprising:
    a connection bracket operatively connected to the second tugger cart; and
    a pivot pin extending through the connection bracket and the connecting arm for allowing pivotable movement of the connecting arm.

3. The connection device of claim 2 wherein the connecting arm includes an opening for allowing the pivot pin to pass therethrough and the connection bracket includes a notch formed therein.

4. The connection device of claim 3 wherein the connecting arm is vertically movable between the storage position and a non-operating position and wherein the connecting arm includes a lock pin projecting therefrom, the lock pin receivable in the notch in the connection bracket with the connecting arm in the the non-operating position whereby the connecting arm is prevented from pivoting to the locking position.

5. The connection device of claim 1 wherein the striker element is a generally U-shaped bracket defining a cavity for receiving the terminal end of the connecting arm with the connecting arm in the locking position.

6. The connection device of claim 1 wherein the locking pin includes a tension pin projecting therefrom.

7. The connection device of claim 6 wherein the handle includes:
    a grasping portion; and an actuating bar pivotably connected to the connecting arm, the actuating bar having a first end connected to the grasping portion and a second end engageable with the tension pin for moving the locking pin from the extended position to the retracted position.

8. A connection device for interconnecting first and second tugger carts, comprising:

a striker element projecting from the first tugger cart; and a connecting assembly operatively connected to the second tugger cart, the connecting assembly including:

a connecting arm having a terminal end that partially defines a recess for receiving the striker element therein, the connecting arm pivotable between a storage position and a locking position and axially movable between an extended position and a non-extended position;

a locking pin operatively movable between an extended position wherein the locking pin extends over an opening to the recess in the connecting arm and a retracted position wherein the striker element to be inserted into and removed from the recess, the locking pin including a lower chamfered face engageable with the striker element as the connecting arm is pivoted from the storage position such that the striker element urges the locking pin towards the retracted position and an upper, non-chamfered face for maintaining the striker element in the recess;

a handle operatively connected to the connecting arm, the handle pivotable between a non-actuated position and an actuated position wherein the locking pin is maintained in the retracted position;

a connection bracket operatively connected to the second tugger cart, the connection bracket having a notch formed therein; and a pivot pin extending through the connection bracket and the connecting arm for allowing pivotable movement of the connecting arm;

wherein the connecting arm includes a lock pin projecting therefrom, the lock pin receivable in the notch in the connection bracket for maintaining the connecting arm in the storage position.

9. The connection device of claim 8 wherein the locking pin includes a chamfered face engageable with the striker element as the connecting arm is pivoted from the storage position to the locking position such that the striker element urges the locking pin towards the retracted position.

10. The connection device of claim 8 wherein the striker element is a generally U-shaped bracket defining a cavity for receiving the terminal end of the connecting arm with the connecting arm in the locking position.

11. The connection device of claim 8 wherein the locking pin includes a tension pin projecting therefrom.

12. The connection device of claim 11 wherein the handle includes:

a grasping portion; and an actuating bar pivotably connected to the connecting arm, the actuating bar having a first end connected to the grasping portion and a second end engageable with the tension pin for moving the locking pin from the extended position to the retracted position.

13. A connection device for releasably connecting first and second tugger carts, comprising:

a generally U-shaped striker element projecting from the first tugger cart, the striker element defining a connection cavity;

a connection bracket operatively connected to the second tugger cart, the connection bracket having a notch formed therein;

a connecting arm having a terminal end that partially defines a recess for receiving the striker element therein, the connecting arm axially movable between an extended position and a non-extended position;

a pivot pin extending through the connection bracket and the connecting arm for allowing the connecting arm to pivot between a storage position and a locking position;

a hollow, locking pin housing operatively connected to the connecting arm, the locking pin housing including a generally axial slot extending along an axis generally parallel to the connecting arm;

a locking pin slidably received within the locking pin housing and being movable between an extended position wherein the locking pin extends over an opening to the recess in the connecting arm and a retracted position wherein the striker element is allowed to be inserted into and removed from the recess;

a tension pin extending laterally from the locking pin through the slot in the locking pin housing, the tension pin guiding movement of the locking pin between the extended position and the retracted position;

biasing structure for urging the locking pin towards the extended position; and a handle operatively connected to the connecting arm, the handle pivotable between a non-actuated position wherein the locking pin is free to move between the retracted position and the extended position and an actuated position wherein the locking pin is maintained in the retracted position;

wherein the connecting arm includes a lock pin projecting therefrom, the lock pin receivable in the notch in the connection bracket for maintaining the connecting arm in the storage position.

14. The connection device of claim 13 wherein the locking pin includes an angled face engageable with the striker element as the connecting arm is pivoted from the storage position to the locking position such that the striker element urges the locking pin towards the retracted position.

15. The connection device of claim 14 wherein the handle includes:

a grasping portion; and an actuating bar pivotably connected to the connecting arm, the actuating bar having a first end connected to the grasping portion and a second end engageable with the tension pin for moving the locking pin from the extended position to the retracted position.

* * * * *